United States Patent [19]
Humphreys

[11] Patent Number: 4,462,650
[45] Date of Patent: Jul. 31, 1984

[54] ELECTRICAL DISTRIBUTION SYSTEM
[75] Inventor: Michael Humphreys, Ealing, England
[73] Assignee: Electrak International Limited, England
[21] Appl. No.: 354,570
[22] Filed: Mar. 4, 1982
[30] Foreign Application Priority Data
Mar. 12, 1981 [GB] United Kingdom ............... 8107821
[51] Int. Cl.³ .............................................. H01R 13/60
[52] U.S. Cl. .............................. 339/22 R; 339/21 R; 339/40; 339/43
[58] Field of Search .................................. 339/21-23, 339/40-44

[56] References Cited
U.S. PATENT DOCUMENTS

| | | | |
|---|---|---|---|
| 2,926,327 | 2/1960 | Metelli | 339/41 |
| 3,951,488 | 4/1976 | Hesse et al. | 339/42 |
| 4,003,618 | 1/1977 | Booty | 339/22 R |
| 4,139,252 | 2/1979 | Gorny | 339/22 B |
| 4,243,284 | 1/1981 | Humphreys | 339/21 R |

Primary Examiner—John McQuade
Assistant Examiner—David L. Pirlot
Attorney, Agent, or Firm—Krass & Young

[57] ABSTRACT

An electrical distribution system comprises a longitudinally-extending conduit containing a plurality of continuous conductors. Spaced apertures are provided in one wall of the conduit to allow access to the conductors for a connecting plug. A safety mechanism is provided at each entry point substantially to prevent access to the conductors by means other than a correct connecting plug, and to facilitate assembly and servicing of the system this safety mechanism comprises a unitary assembly which can be inserted into or removed from the conduit as a self-contained unit.

9 Claims, 2 Drawing Figures

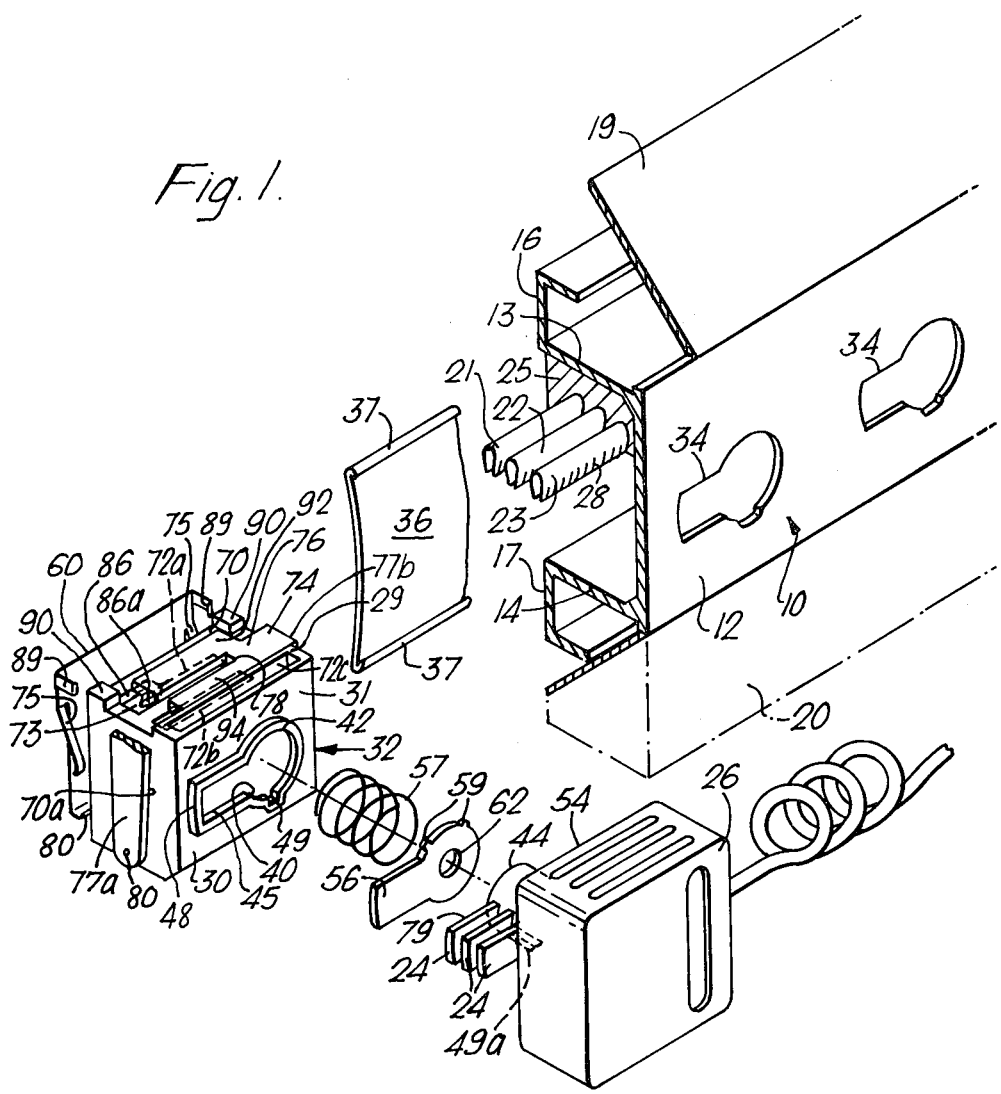

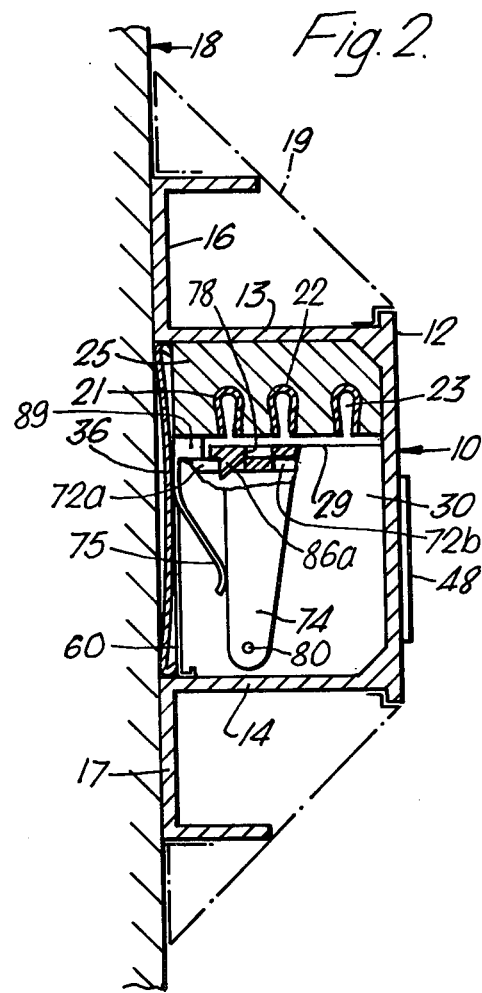

ELECTRICAL DISTRIBUTION SYSTEM

BACKGROUND OF THE INVENTION

This invention relates to an electrical distribution system of the kind comprising a hollow conduit enclosing a plurality of continuous electrical conductors, access to the conductors being achieved by means of a contact plug which can be fitted into the housing at a series of entry points.

An electrical distribution system of this kind is described and claimed in U.S. Pat. No. 4,243,284, which describes a length of hollow conduit formed with an aperture in one wall through which a plug can be inserted; rotation of the plug brings its contact pins into contact with the conductors. A safety arrangement is provided, comprising a series of internal safety doors disposed within the conduit, which are biassed into normally closed positions in which they close off the part of the conduit containing the conductors from the aperture. The action of pushing a contact plug into the aperture opens the safety doors and enables the plug to be rotated into a position in which the contact pins contact the conductors. The design of the system makes access to the conductors by means other than the correct plug very difficult.

In U.S. patent application Ser. No. 314,819 a modified arrangement of this system is described in which a series of spaced apertures are used in combination with various alternative arrangements of safety doors.

A disadvantage of systems of this kind is that the mechanisms for the internal safety doors can be relatively complicated, and as a result difficulties can arise during assembly of the system, and particularly if servicing is required after installation. It is an object of the invention to provide an electrical distribution system of the kind described in which the safety door mechanisms are simplified such that assembly and servicing is greatly facilitated.

SUMMARY

The invention provides an electrical distribution system of the kind comprising a hollow conduit having walls defining a longitudinally-extending enclosure, a plurality (i.e. two or more) of continuous electrical conductors disposed within the enclosure, aperture means in one wall of the conduit defining a plurality of longitudinally-disposed entry positions for access to the enclosure, a safety closure mechanism disposed within the enclosure at each of the entry positions which incorporates a safety door movable from a normally closed position in which access to the conductors from the aperture means at a respective entry position is prevented, to an open position in which access to the conductors can be achieved; and a connecting plug having an element adapted for insertion through the aperture means at an entry position which element includes a plurality of contact pins and which is adapted to move the safety door into the open position to enable the contact pins to be brought into contact with said conductors, each safety closure mechanism comprising a unitary assembly adapted for insertion into or removal from the conduit as a self-contained unit.

By making the safety closure mechanism as a unitary assembly which can be inserted into or removed from the casing as a self-contained unit, the construction and assembly of the electrical distribution system is simplified and servicing of the system in the event of failure of a component is facilitated.

Advantageously, the contact pins of the plug extend substantially radially with respect to the axis along which the element must be inserted to gain entry to the enclosure through the aperture means, and the plug is adapted to be rotated about said axis, after insertion at an entry position, to cause the pins to make electrical contact with the respective conductors. The safety door may be adapted to be moved from its closed to its open position simply by insertion of the element through the aperture means at an entry position, but in the preferred arrangement, the safety door is adapted to be moved from its closed to its open position by rotation of the plug after insertion of the element through said aperture means at an entry position.

The unitary assembly suitably comprises a housing, an opening in one wall of the housing adapted to receive said element of the contact plug, and one or more apertures in another wall of the housing through which the contact pins can pass when the plug is rotated to make contact with the respective electrical conductors; and in the closed position the safety door normally covers one or more of the apertures substantially to prevent access to at least the live conductor by means other than the correct plug.

In one embodiment of the invention, the safety door comprises a pivotally mounted shutter element, and spring means are provided biassing the shutter element into the closed position, and an abutment surface is formed on the shutter element operable to be engaged by one of the pins of the plug during rotation thereof to move the shutter element into the open position.

The apertures in the housing through which the contact pins can pass may comprise two or more parallel slots at least two of which are covered by the shutter element in the closed position thereof; and the shutter element is provided with a corresponding slot adapted to be aligned with one of the slots in the housing in the open position of the shutter element. Where an earth conductor is provided, it is not necessary for this to be protected by a safety door.

The aperture means in the conduit wall advantageously comprises a series of spaced entry apertures each defining an entry position for a contact plug, which apertures are shaped to receive a connecting plug in a particular orientation thereof, and the opening in the housing of the unitary assembly is shaped to correspond thereto. In this case, the opening in the housing may be provided with a peripheral bead adapted to fit within a respective entry aperture in the wall of the conduit, thereby locating the housing within the enclosure.

In an alternative arrangement, the aperture means in the casing comprises a continuous opening such as an elongate slot, and the unitary assemblies define spaced entry points along the slot.

Preferably, the opening in the housing of the unitary assembly is normally covered by an entry door which is displaced when a contact plug is inserted into the housing. This entry door may incorporate means for locating a plug within the enclosure; for example, in one embodiment the end face of the contact plug is provided with a cylindrical boss, and the entry door is provided with a corresponding circular recess into which the boss of the contact plug can be fitted. This locates the contact plug and guides its rotational movement as the plug is turned into the contact position.

Suitably, spring means are provided within the enclosure urging the entry door into the closed position. When the contact plug is inserted, it is pushed in against the spring pressure of the entry door and the entry door is displaced along the rotational axis of the contact plug. The contact plug is subjected to this axial spring force when it is disposed inside the housing, and this serves to improve contact between its pins and the continuous conductors and also operates to eject the plug out of the housing when the plug is rotated out of its contact position.

In an embodiment of the invention, the electrical conductors are disposed in a support within the casing, and this support is located and retained in position by the unitary assemblies in the casing.

BRIEF DESCRIPTION OF THE DRAWINGS

FIG. 1 shows an exploded perspective view of an electrical distribution system comprising a length of conduit incorporating a plurality of continuous conductors, and a unitary assembly adapted to be located at each entry point, and a contact plug; and FIG. 2 shows a vertical section taken through the same track with the unitary assembly in position in the conduit.

DESCRIPTION OF THE PREFERRED EMBODIMENTS

Referring to the drawings, these show an electrical distribution system of the continuous track type comprising an elongate casing 10 forming a hollow conduit having a front wall 12, and upper wall 13, and a lower wall 14. The conduit can be made of any suitable conductive or non-conductive material such as metal or plastics. In the example illustrated, the conduit is a one-piece aluminium alloy extrusion, although it may be made in separate parts and subsequently assembled.

Upper wall 13 and lower wall 14 are each provided with flanges 16, 17 respectively extending along their rear edges, and these are used to secure the conduit to any suitable flat surface such as a wall 18. Flanges 16, 17 and the front edges of upper and lower walls 13, 14 comprise interlocking formations which can be used to clip a trim piece 19 onto the upper and lower walls to improve the finished appearance of the casing. These trim pieces are omitted if the conduit is recessed into wall plaster. A rectangular section extension 20 (FIG. 1) may be fitted to lower wall 14 if desired in place of a trim piece to form a skirting board.

The hollow conduit 10 contains three continuous electrical conductors 21, 22, 23 which are disposed within the conduit in a conductor support 25 made from a suitable non-conductive material such as a plastics material. PVC plastics material is preferred for this purpose in common with conventional cable sheaths. The conductor support 25 is made in an extrusion process and the conductors 21, 22 and 23 may be moulded simultaneously integrally with this support.

The conductors 21, 22, 23 are of generally inverted U-shape in cross-section and are adapted to receive the contact pins 24 of a connecting plug 26 shown in the drawings, as will be described. They are of generally resilient conductive material such as brass and are suitably shaped so that the pins of the plug are gripped when it is rotated into the contact position. In order to improve electrical contact with the pins, the lower edges of the conductors may be cut at intervals, as shown at 28.

The conductor support 25 is located transversely in the conduit against the upper wall 13 thereof by abutment with the upper wall 29 of a housing 30 of a unitary assembly generally indicated at 32, one of which is located at each entry point for a connecting plug. These entry points are defined by spaced openings 34 formed in the front wall of conduit 10. As will be seen from the drawing, the rear wall of the conduit is provided by a continuous back-plate 36 which is formed along its upper and lower edges with a beading 37 which clips over projecting formations provided on the rear of the conduit. The back-plate 36 is made from a resilient material such as spring steel or a plastics, and is clipped onto the conduit after assembly of the various components. Other means may be provided for retaining the back-plate 36 in position, such as screws or rivets. Each unitary assembly 32 provides the safety arrangements for restricting access to the conductors by means other than the correct connecting plug. The modular nature of each assembly 32 greatly facilitates the assembly of the electrical distribution system and if failure of a component occurs this assembly can easily be replaced. The arrangement of unitary assembly described may be used for any kind of continuous track system including such a system utilising a conventional three-pin electrical plug.

A unitary assembly 32 comprises a generally rectangular housing 30 provided with an opening 40 in its front wall 31. The opening 40 is of substantially the same shape as the opening 34 formed in the front wall 12 of the conduit, being of generally keyhole-shape having a circular portion 42 adapted to receive the cylindrical head part 44 of the connecting plug 26, and an elongate portion 45 adapted to receive the contact pins. A peripheral beading 48 is provided around the opening 40 projecting beyond the front wall of the housing 30, and the outer edges of this beading fit exactly within an opening 34, thus locating the housing 30 in position within the conduit.

The beading 48 is interrupted by a slot 49 provided in its lower edge, and this slot is shaped to engage a corresponding lug 49a formed on the cylindrical part 44 of the connecting plug. The lug 49a terminates at a point spaced from the main body part 54 of the plug, and in order to rotate the plug into the contact position, it must first be pushed into the housing 30 so that the lug clears the inner face of the front wall 31. If the plug is not pushed far enough into the housing, it cannot be rotated due to the locking effect of lug 49a in slot 49.

Opening 40 is normally closed by an entry door 56 which is disposed within the housing 30 and is biassed into the closed position by a coil spring 57, one end of which engages the inner face of the entry door. As will be described hereinafter, the coil spring 57 is supported at its other end by the rear face of the housing 30, which is formed by a metal back-plate 60. The front face of the entry door 56 is provided with a recess 62 which engages a corresponding boss formed on the front face of the cylindrical portion 44 of the connecting plug. This recess 62 aids location of the plug in the housing 30 and acts as a bearing face when the plug is rotated.

Movement of the entry door away from its closed position covering opening 42 is caused by pushing the plug into the opening 40 against the pressure of spring 57. Lugs 59 provided on the entry door 56 are engageable with guide surfaces formed in the housing to ensure that door 56 moves freely into the housing when a plug is inserted.

The upper wall 29 of the housing 30 is provided with three longitudinally extending slots 72a, 72b, 72c through which the contact pins 24 of the plug must pass in order to make contact with the continuous conductors 21, 22 and 23. However, even though access to the interior of the housing 30 can be achieved through the entry door, contact with the conductors cannot be made without first moving a safety door away from a closed position covering slots 72a, 72b. Slot 72c provides access to earth conductor 21 and is not covered by the safety door.

Slots 72a and 72b are located in a recessed portion 70 of upper wall 29, and the safety door is in the form of a generally U-shaped shutter member 74 having an upper wall 76 (partially broken away in the drawing) received within recessed portion 70, and downwardly-depending legs 77a, 77b. It is pivotally mounted on the housing 30 at 80 close to the free ends of the legs, for pivotal movement relative to the housing. The upper wall 76 is formed with an elongate slot 78 which corresponds in size with slot 72a, but which in the closed position of the shutter, is located over the solid wall portion 73 between slots 72a and 72b. The shutter 74 is biassed into a closed position in which its rear edge 92 covers slot 72a, and its front edge 94 covers slot 72b, by means of a pair of shutter springs 75 which are bent out from the plane of a metal back-plate 60 used for closing the rear wall of the housing 30. Back-plate 60 is made from a material such as spring steel and the springs 75 operate as leaf springs. These springs abut the rear edges of the legs 77a, 77b of the shutter member 74 and urge the shutter member in a direction towards the front edge 70a of the recessed portion 70, into its closed position.

The shutter member 74 is pivoted between its open and closed positions by abutment with the contact pins of the plug as they are rotated into the contact position. For this purpose, the shutter is provided with a ramp element 86a which extends downwardly into the housing 30 through slot 72a, and which is adapted to engage the tapered end of the live contact pin 79 of the plug 26. As the plug is rotated into the contact position, the end of pin 79 engages the ramp element 86a and pushes the shutter member rearwardly against the pressure of springs 75; this moves the front edge 94 of the shutter clear of slot 72b and the rear edge 92 clear of slot 72a by aligning elongate slot 78 in the shutter with slot 72a, thus opening the aperture 72 and allowing the contact pins to be rotated fully into the contact position. The particular arrangement of aligned slots requires only a very small degree of movement for the shutter to pass between the open and closed positions. In the open position of the shutter, the ramp element passes into a recess 86 formed in the rear edge of the aperture 72a.

When plug 26 is in the contact position, continuous pressure is applied to it by coil spring 57, thus improving the electrical contact between the pins and the conductors. Furthermore, when the plug is rotated out of its contact position, coil spring 57 assists in ejecting the plug out of housing 30.

It will be appreciated that other spring means for biassing the shutter into the closed position can be used, for example coil springs may be provided between leg 77a, 77b and back-plate 60. Alternatively the shutter member may be biassed by gravity into the closed position and the spring means may be omitted. In the embodiment shown in FIGS. 1 and 2, two leaf springs 75 are used each bearing on a leg 77; this ensures that should one of the shutter springs become inoperative, the shutter will still be biassed by the other spring into the closed position.

The spring plate 60 is used to close the housing 30 and retain coil spring 57 and door 56 in position by engagement of its overturned edge 88 with a slot formed in the bottom wall of the housing 30, and by engagement of ears 89 with lugs 90.

It will be appreciated that the modular arrangement described may be used in any suitable electrical distribution system.

I claim:

1. An electrical distribution system of the kind comprising a hollow conduit having walls defining a longitudinally-extending enclosure and having a plurality of continuous electrical conductors disposed within said enclosure, at least one of said conductors being a live conductor; aperture means in one wall of said conduit defining a plurality of longitudinally spaced entry positions for access to the enclosure; a self-contained, unitary safety closure assembly disposed within the enclosure at each of said entry positions to receive a connecting plug and provide for selective access between said plug and said conductors the assembly including a housing having formed therein a first aperature aligned with and substantially coextensive with the aperture means in said one conduit wall, first door means normally closing said first aperture but resiliently movable to an open position by insertion of said connecting plug, said housing having second aperture means formed therein and aligned with said conductors for providing access from the interior of said housing to said conductors, safety door means movable from a normally closed position in which access to the conductors from the interior of said housing is prevented, to an open position in which access to the conductors can be achieved; said safety door means including operator means engageable with a portion of said plug for moving the safety door means from the closed to the open position upon manipulation of said plug in said housing, and a connecting plug having an element adapted for insertion through said aperture means and said first aperture at an entry position which element includes a plurality of contact pins and which is adapted when manipulated in the inserted position within said housing to move said safety door means into the open position to enable said contact pins to be brought into contact with said conductors.

2. An electrical distribution system as claimed in claim 1, wherein said continuous conductors are disposed in the enclosure in a longitudinally-extending support; and said unitary assemblies are adapted to locate and retain said support in position within the enclosure.

3. An electrical distribution system as claimed in claim 1, wherein the contact pins of the plug extend substantially radially with respect to the axis along which said element must be inserted through said aperture means and said first housing aperture to gain entry to said enclosures through said aperture means, and said plug is adapted for rotational manipulation about said axis, after insertion at an entry position, said rotational manipulation causing contact between said pins and said operator means to open said safety door means and to caus the pins to make electrical contact with said conductors.

4. An electrical distribution system as claimed in claim 3, wherein said aperture means in said conduit wall comprises a series of spaced entry apertures each defining an entry position for said element adapted for insertion, which apertures are shaped to receive said element in a particular orientation thereof, and said opening in the housing of the unitary assembly is shaped to correspond thereto.

5. An electrical distribution system as claimed in claim 4, wherein the opening in said housing is provided with a peripheral bead adapted to fit within a respective entry aperture in the wall of the conduit, thereby locating the housing within the enclosure.

6. An electrical distribution system as claimed in claim 3, wherein said safety door means comprises a pivotally mounted shutter element, and spring means are provided biassing said shutter element into the closed position, and an abutment surface is formed on said shutter element operable to be engaged by one of the pins of said plug during rotation thereof to move said shutter element into the open position.

7. An electrical distribution system as claimed in claim 6, wherein the second apertures in the housing through which the contact pins can pass comprise two or more parallel slots at least two of which are covered by said shutter element in the closed position thereof; and said shutter element is provided with a corresponding slot adapted to be aligned with one of the slots in said housing in the open position of the shutter element.

8. An electrical distribution system as claimed in claim 3, wherein said housing further comprises spring means biassing said first door means into a closed position across said first opening, whereby said first door means is displaced against the action of said spring means when said element of said contact plug is inserted into said opening.

9. An electrical distribution system as claimed in claim 8, wherein the outer surface of said entry door is shaped axially to locate said connecting plug during insertion and rotation thereof.

* * * * *